(12) United States Patent
Geldart et al.

(10) Patent No.: US 6,215,440 B1
(45) Date of Patent: *Apr. 10, 2001

(54) EMITTER IDENTIFICATION FROM RADIO SIGNALS USING KEYCLICK ALGORITHM

(75) Inventors: Timothy A. Geldart, Gaithersburg; Alvin F. Martin, Potomac; James D. Mosko, Germantown; Fred J. Goodman, Gaithersburg, all of MD (US)

(73) Assignee: General Dynamics Government Systems Corporation, Needham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 07/624,379

(22) Filed: Dec. 7, 1990

(51) Int. Cl.[7] ............................. G01S 13/00; G01R 23/16
(52) U.S. Cl. ....................................... 342/192; 324/76.12
(58) Field of Search .................... 342/13, 192; 324/76.12

(56) References Cited

U.S. PATENT DOCUMENTS 3,924,182 * 12/1975 Jensen ................................. 342/192
4,885,586 * 12/1989 Hoover et al. ...................... 342/192

* cited by examiner

*Primary Examiner*—Mark Hellner
(74) *Attorney, Agent, or Firm*—Jenner & Block

(57) ABSTRACT

An algorithm for emitter identification of a transmitting platform using microphone keyclick analysis, and a system utilizing said algorithm, wherein said algorithm processes audio signals to detect transmission activity on a radio channel in the audio frequency range, detects the boundaries of transmitter keyclicks at the beginning and end of said transmission; extracts keying envelopes from said detected keyclick boundaries; and analyzes said keying envelopes to extract features characteristic of said keyclicks. The algorithm and system then proceed to execute a decision function based on said extracted characteristic features to identify the platform of said transmitter based on the features of said keyclick. A second algorithm, which may be executed in parallel with the first by said system, processes said transmission data using a fast fourier transform, detecting gaps in said processed transmission data. It then extracts spectral features consisting of normalized energy per unit frequency from said gaps; and correlates identification of said emitter platforms based on said extracted spectral features with identification of said emitter platforms based on said extracted keyclick features.

18 Claims, 14 Drawing Sheets

$$\text{AMPLITUDE RATIO} = \frac{P2/P1 + P3/P1}{2}$$

$$\text{PEAK TO VALLEY RATIO} = \frac{P1/V1 + P2/V2}{2}$$

RECOGNIZED AS
| | | TYPE 3 | TYPE 1 | TYPE 2 | GROUND | NO DEC. | CORRECT/ TOTAL | PERCENT |
|---|---|---|---|---|---|---|---|---|
| ACTUAL | TYPE 3 | 16 | 1 | 0 | 0 | 1 | 16/17 | 94.1% |
| | TYPE 1 | 1 | 10 | 0 | 0 | 3 | 10/11 | 90.1% |
| | TYPE 2 | 0 | 4 | 19 | 0 | 2 | 19/23 | 82.6% |
| | GROUND | 0 | 0 | 0 | 5 | 0 | 5/5 | 100.0% |
NO DECISION RATE: 6/62 9.7% 50/56 89.3%

EMITTER IDENTIFICATION FROM RADIO SIGNALS USING KEYCLICK ALGORITHM

CROSS-REFERENCE TO RELATED APPLICATION

This application is related to another application entitled EMITTER IDENTIFICATION FROM RADIO SIGNALS USING FILTER BANK ALGORITHM, filed simultaneously herewith, having the same inventors and assigned to the same assignee as this application, and which is incorporated herein by reference.

This invention was made with Government support under Contract No. F30602-87-D-0085/0010 awarded by the Department of the Air Force. The Government has certain rights in this invention.

BACKGROUND OF THE INVENTION

This application pertains generally to digital signal processing, and in particular to the processing of detected radio signals emitted in the audio frequency bands. Specifically, this invention pertains to an algorithm which analyzes unintentional emissions from audio frequency platforms using push-to-talk transmitters and identifies the emitting platforms.

Intercepted audio band transmissions from unknown sources frequently contain modulations other than those associated with voice. These modulations can be generated by propulsion systems, transmitters, heating and cooling equipment, or other systems associated with the transmitting platform, and are unintentional. Such unintentional modulations can permit platform identification when properly detected, analyzed, and interpreted.

Various governmental and industrial organizations have signal collection activities which gather massive amounts of voice channel data. This data is or is not of interest, depending on the information contained in the voice signal and any additional information that might be gleaned from the channel itself. Additional data from unintentional modulations can be used to assist in culling uninteresting data and as a means of providing "external" cues to the identity or location of the transmitting device. Such information is of value in search and rescue missions. Exploring possible analysis techniques for exploiting unintentional modulations is a continuing activity of these organizations.

Some of these organizations are interested in the use of passive devices to detect, select, and identify signal sources of interest. Since the activities of the signal sources frequently are accompanied by radio transmissions, it was deemed possible to identify the emitting platform by detecting and identifying unintentional modulations imposed on the transmission. In addition, classifying emitters based on unintentional modulations can enhance the correlation of identification data from other, usually known reliable, sources.

SUMMARY OF THE INVENTION

The principal object of this invention is to provide a feasible method of using non-speech audio band information to obtain identification information pertaining to the emitting platform.

A further object of the invention is to provide a method for identification of the emitting platform by detecting and identifying unintentional modulations imposed on the transmission.

Still a further object of the invention is to provide a method for classifying emitters based on unintentional modulations to enhance the correlation of identification data from other sources.

Still another object of the invention is to provide a method to identify the emitting platform based on its unique keyclick feature signature or unintentional modulations.

Another object of this invention is to provide an algorithm to automatically detect, segment, and identify these unique keying features, the accuracy of the resulting algorithm performance being based on the "ground truth" associated with several emitting platforms.

In a first aspect of the invention, a system for emitter identification of a transmitting platform using microphone keyclick analysis, comprises a means to detect transmission activity on a radio channel in the audio frequency range and a means to detect the boundaries of transmitter keyclicks at the beginning and end of said transmission. It further includes means to extract keying envelopes from said detected keyclick boundaries and means to analyze said keying envelopes to extract features characteristic of said keyclicks. Finally, the system has means to execute a decision function based on said extracted characteristic features to identify the platform of said transmitter based on the features of said keyclick.

In a second aspect of the invention, the system also includes means to process said transmission data using a fast fourier transform and means to detect gaps in said processed transmission data and to extract spectral features consisting of normalized energy per unit frequency. The system further includes means to correlate identification of said emitter platforms based on said extracted spectral features with identification of said emitter platforms based on said extracted keyclick features.

In a third aspect of the invention, a method of emitter identification of a transmitting platform using microphone keyclick analysis, comprises the steps of: detecting transmission activity on a radio channel in the audio frequency range; detecting the boundaries of transmitter keyclicks at the beginning and end of said transmission; extracting keying envelopes from said detected keyclick boundaries; analyzing said keying envelopes to extract features characteristic of said keyclicks; and executing a decision function based on said extracted characteristic features to identify the platform of said transmitter based on the features of said keyclick.

In a fourth aspect of the invention, the method of this invention further comprises the steps of: processing said transmission data using a fast fourier transform; detecting gaps in said processed transmission data; extracting spectral features consisting of normalized energy per unit frequency; extracting spectral features of each transmission from said gaps; and correlating identification of said emitter platforms based on said extracted spectral features with identification of said emitter platforms based on said extracted keyclick features.

Other objects, features and advantages of the invention will be apparent to those skilled in the art from the following description of the preferred embodiments.

DESCRIPTION OF THE PREFERRED EMBODIMENTS

Figure 1:
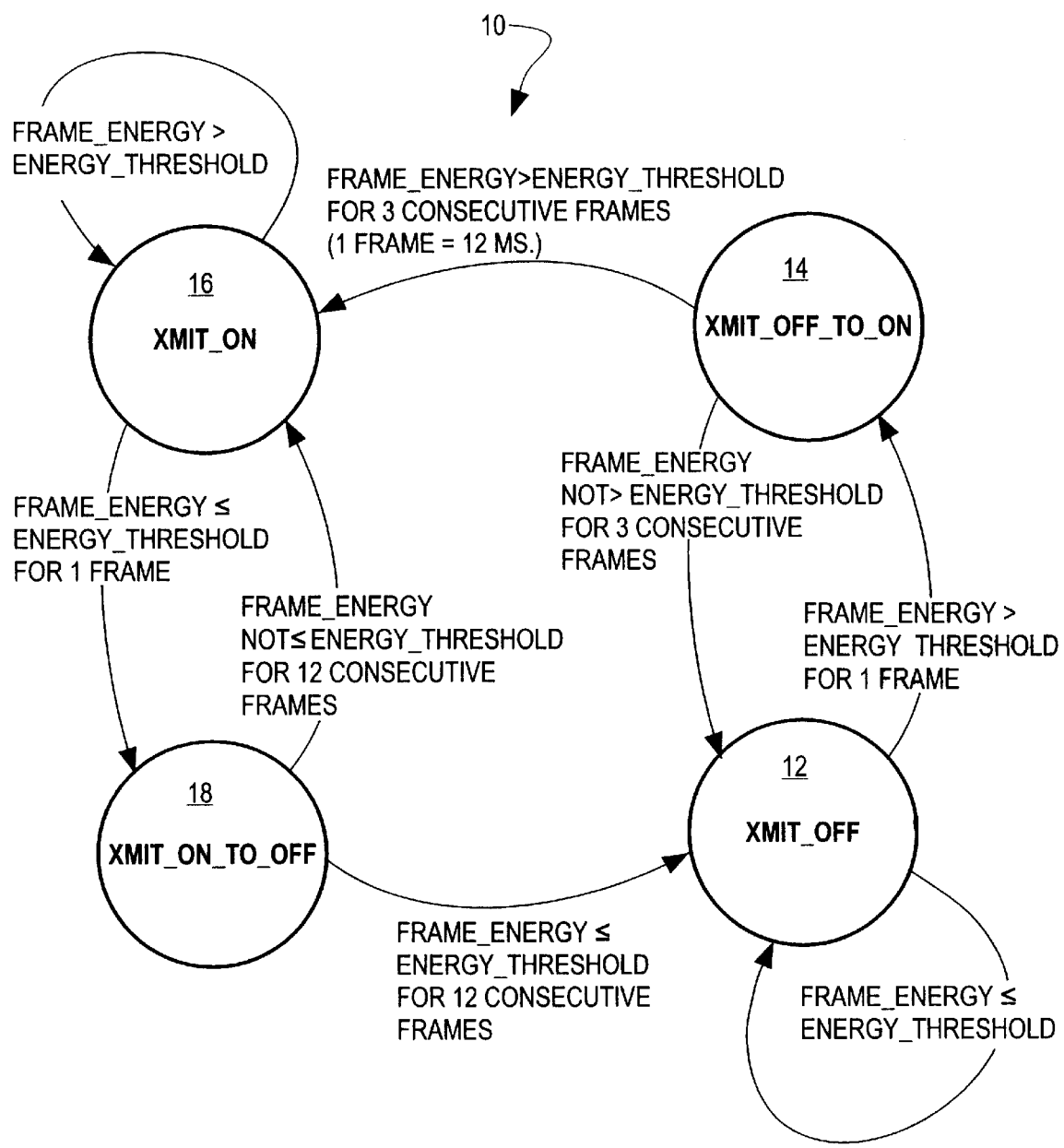
FIG. 1 is a diagrammatic representation of a transmission detection state machine.
Figure 2A:
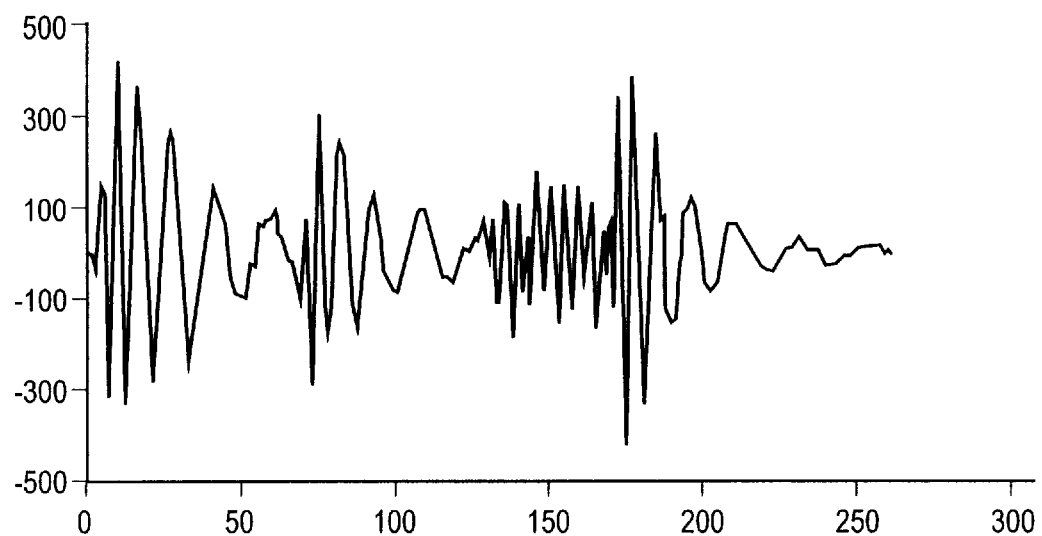
FIGS. 2a, 2b show a keyclick from a Type 3 aircraft and its envelope, respectively.
Figure 2B:
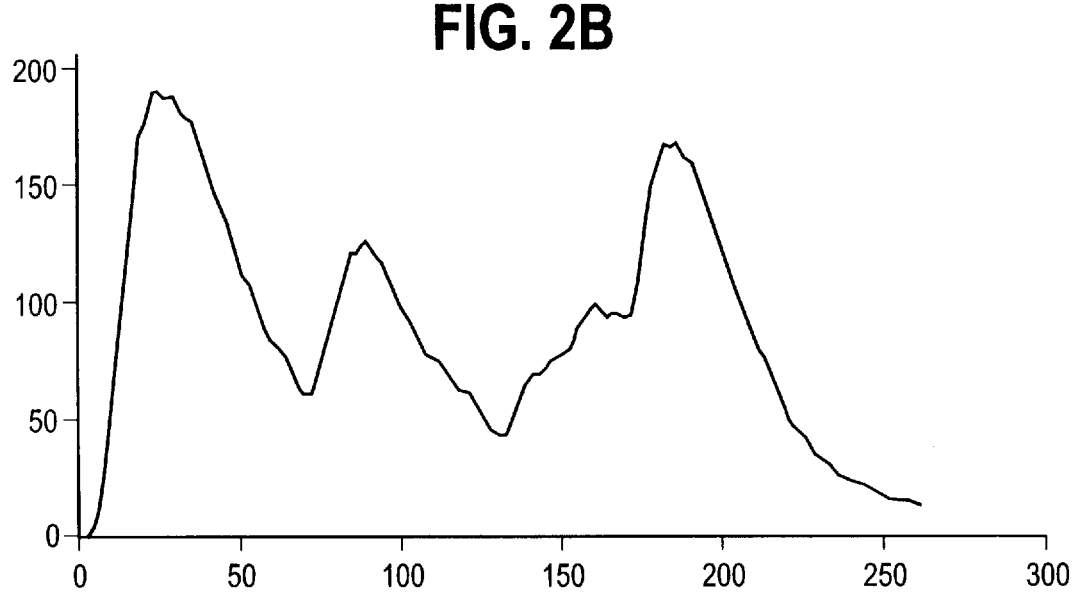
Figure 3A:
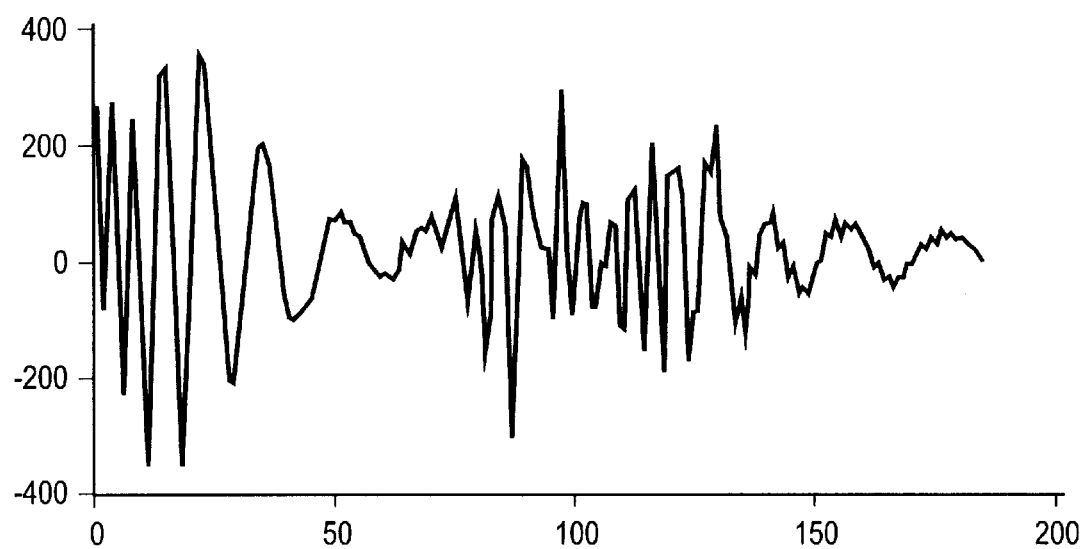
FIGS. 3a, 3b show a keyclick from a Type 2 aircraft and its envelope, respectively.
Figure 3B:
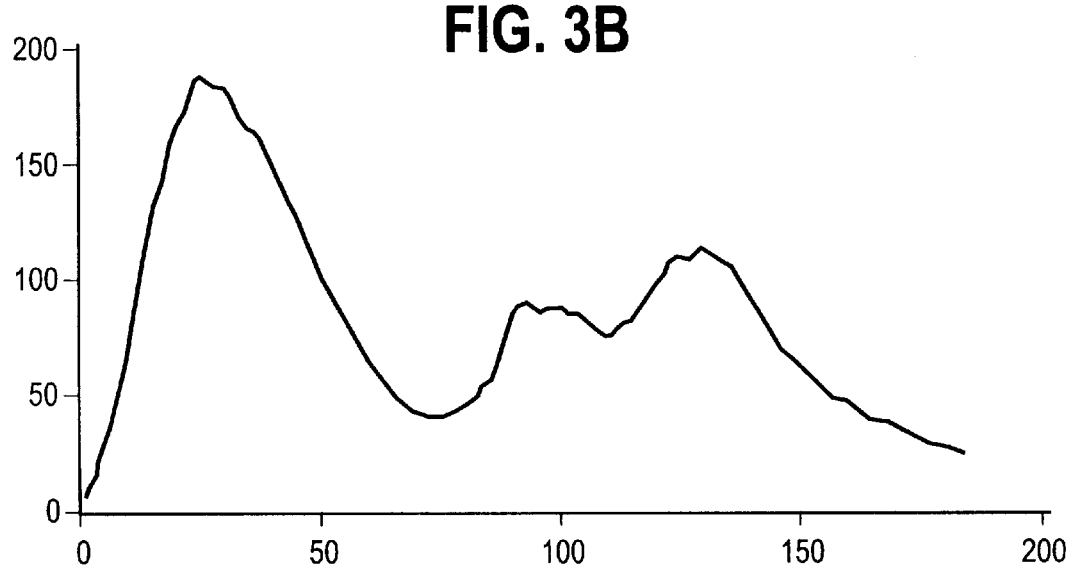
Figure 4A:
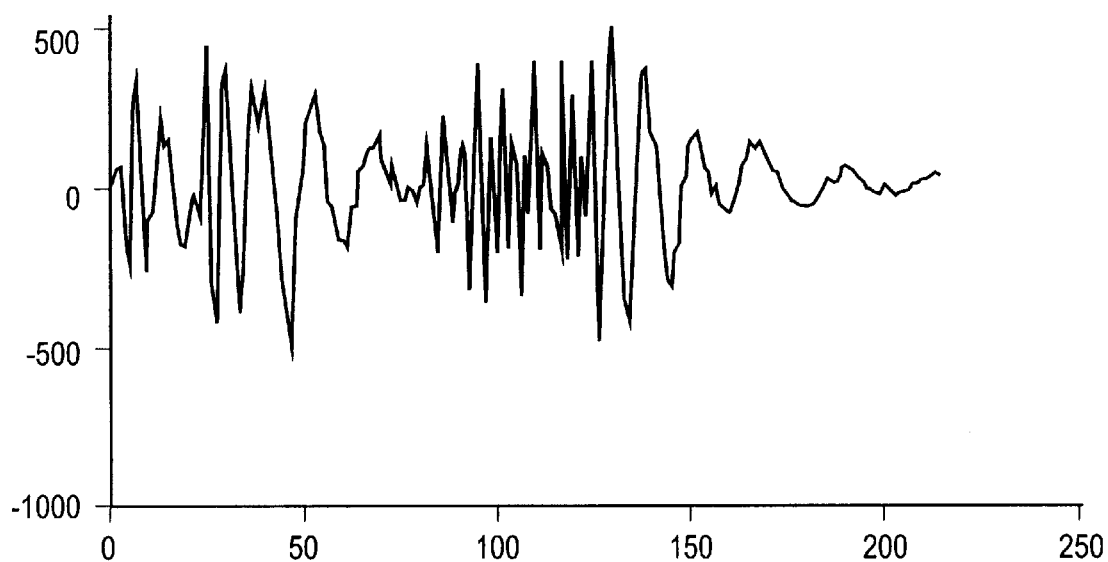
FIGS. 4a, 4b show a two pop keyclick from a Type 1 aircraft and its envelope, respectively.
Figure 4B:
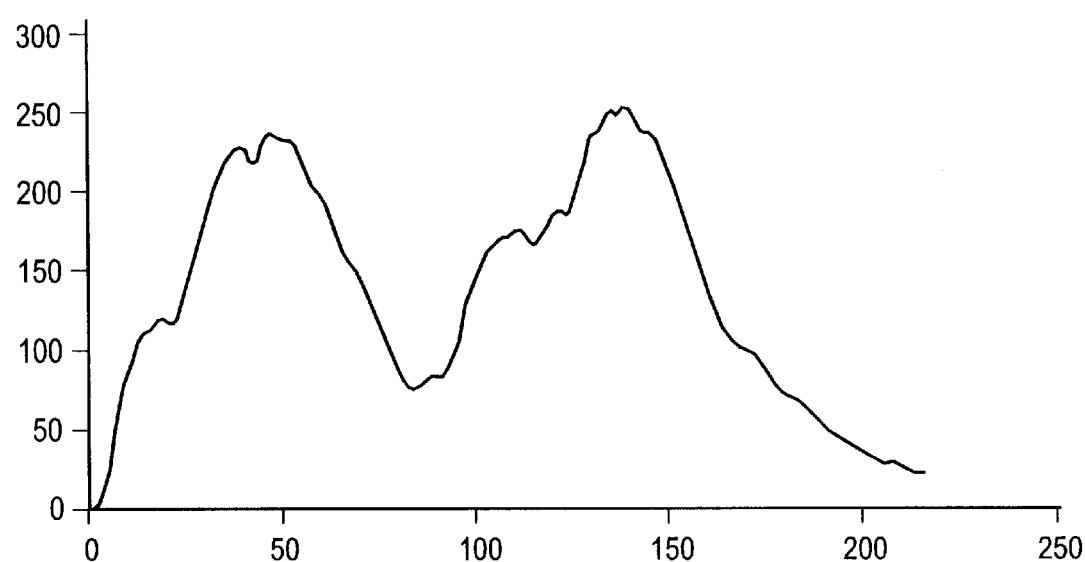
Figure 5A:
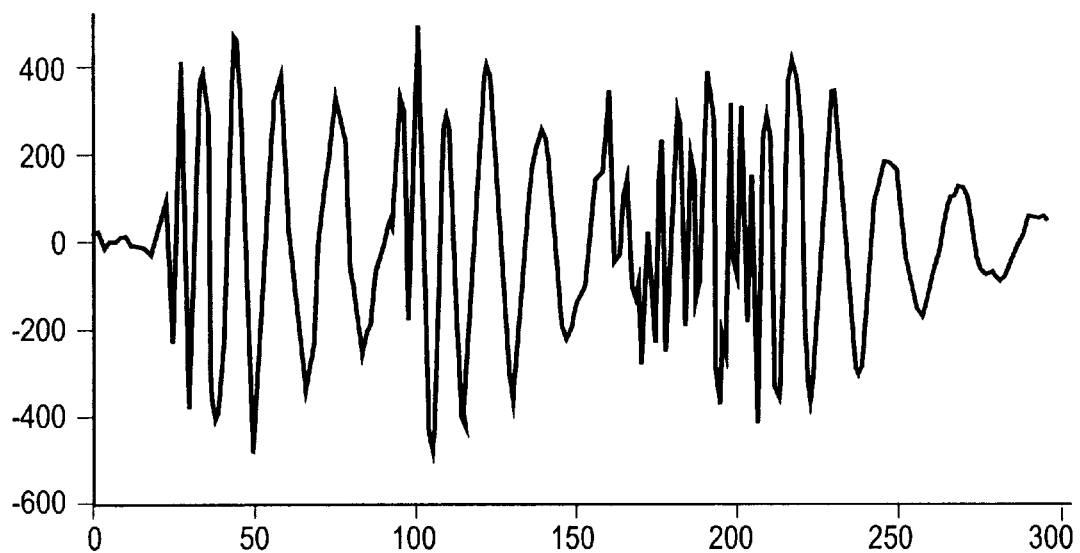
FIGS. 5a, 5b show a three pop keyclick from a Type 1 aircraft and its envelope, respectively.
Figure 5B:
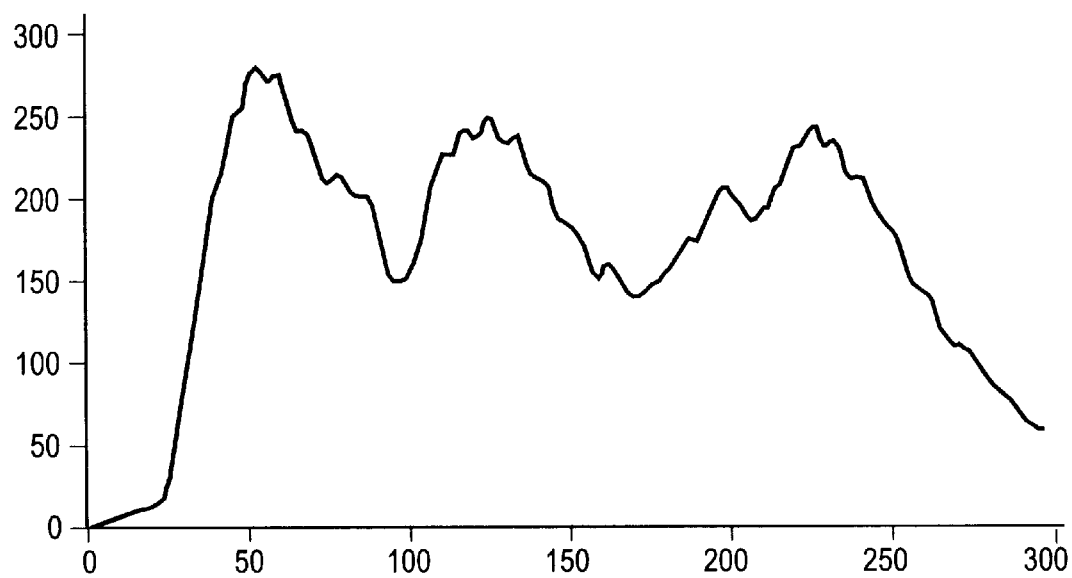
Figure 6A:
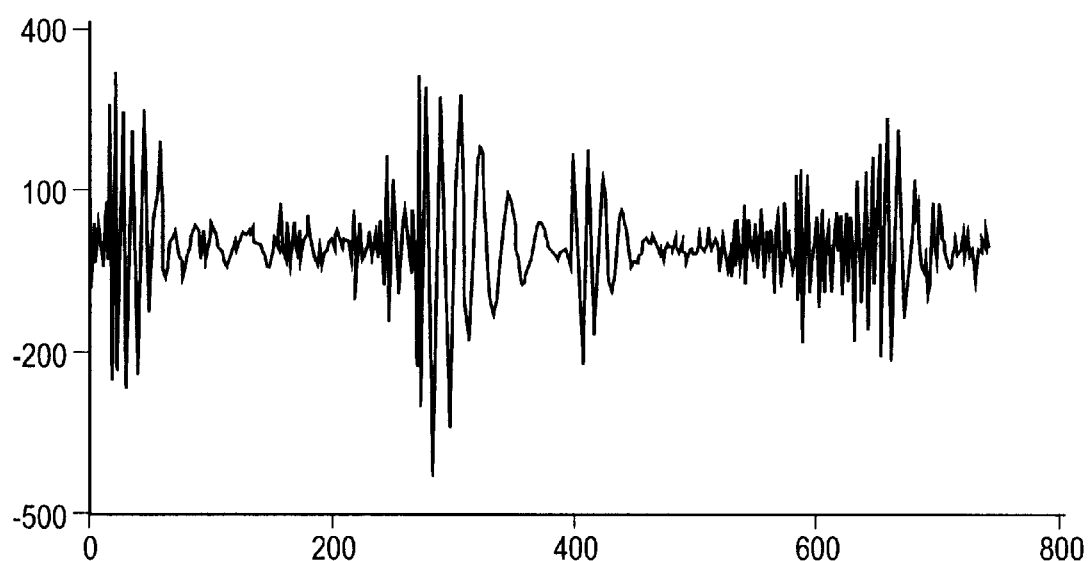
FIGS. 6a, 6b show a ground controller keyclick and its envelope, respectively.
Figure 6B:
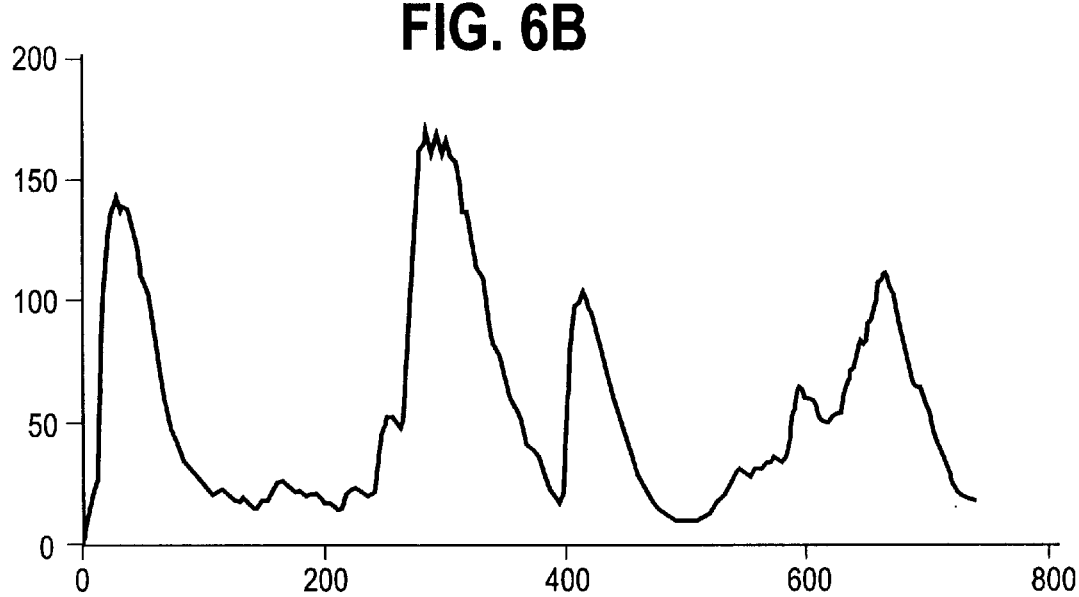

This invention pertains to algorithms within a system for emitter identification from radio signals (EMIRS) The system comprises a collection of digital signal processing algorithms which automatically detect, segment, and identify the on-off keying signatures of push-to-talk audio frequency transmitters. In sequence, the algorithms detect channel activity and the presence of an on-off keying event; segment the event from the accompanying speech signal; analyze the event for key features; and based on these features, perform a directed decision search through prestored, signal source signatures to determine the identify of the push-to-talk emitter. EMIRS was implemented on a SUN workstation and a VAX workstation using Unix and the C language.

By definition, audio band data are contained in a restricted bandwidth, usually 300 to 3000 Hz in width. The bandwidth can vary according to the range of transmission conditions and transmitters. Push-to-talk microphone and radio transmitter combinations frequently have unique keying features, and generic classes of platforms usually are equipped with a given class of transmitters. It should be possible, therefore, to identify the emitting platform by detecting and identifying unintentional modulations or its unique feature signature imposed on the transmission. In addition, classifying emitters based on unintentional modulations can enhance the correlation of identification data from willing sources.

Based on this logic, the algorithms of this invention were developed to automatically detect, segment, and identify these unique keying features. The accuracy of the resulting algorithm performance was based on the "ground truth" associated with several emitting platforms. Ground truth, as used here, means that the precise identification of the platform was known a priori from other sources. The development effort required finding appropriate databases to use in the investigation. An appropriate database requires that its data be realistic for the problem, and contain "ground truth" information. Two sample databases were located for development of these algorithms, each involving transmissions to or from aircraft. These will be designated DB ONE and DB TWO. The aircraft will be designated Type 1 through Type 6. A helicopter and ground control are also included in one or both of the databases.

The development also required finding appropriate features to extract the data bases for identification, and finding appropriate algorithms to carry out the identification. Feature selection involved examination of relevant data in both the time and frequency domains, and the expertise that could be offered by an operational linguist skilled at listening to such data. Since most transmissions were dominated by speech data, appropriate gaps had to be located, or techniques found to suppress the speech data. For operational data, the knowledge of a human expert was used.

Several major approaches to identification algorithms were used in these investigations. The first approach investigated distinctive features in the time domain. The most distinctive features were the keyclicks which preceded and followed each transmission. Significant recognition performance resulted from this approach, using a keyclick algorithm, which is the subject of this application.

DB ONE includes transmissions involving three types of aircraft and ground controllers, recorded during pilot training exercises. Complete "ground truth" information about aircraft types, tail numbers, and pilot identities is included with the database. The entire database consists of thousands of transmissions from various training exercises. A subset of the higher quality transmissions was used for developing the algorithms of this invention.

KEYCLICK INVESTIGATIONS

In DB ONE it was found that the keyclicks of radio transmissions from aircraft in the audio frequency band, particularly the offclicks, contain useful information. It was found that the envelopes of such clicks consisted of a series of "pops", corresponding to peaks. The number of pops in a keyclick and certain related features were used, along with a decision tree or vector quantization approach to identification. Performance at an 80% level for distinguishing among the aircraft types involved was obtained.

The keyclick investigations focused on finding discriminating features in the off-keyclicks of a platform's radio transmissions. The list of processes that comprise the Keyclick Identification algorithm are:

A. Transmission Detection.
B. Click Detection.
C. Feature Extraction and identification.

Even though transmission detection and keyclick detection are not involved in actual identification, they are processes whose performance cannot be taken for granted. For that reason, considerable effort was expended to develop effective transmission and keyclick recognizers in addition to identifying keyclick features and decision methods.

TRANSMISSION DETECTION

Transmission detection is accomplished through energy thresholding over 12 millisecond frames of data to determine the approximate boundaries of a transmission. The transmission detector is implemented as a state machine 10, illustrated in FIG. 1, with four states, 12, 14, 16 and 18. Two of the states corresponded to being within a transmission 16 and outside of a transmission 12. Two additional states 14, 18 are used for the transitions between the transmit-on and transmit-off states. The energy threshold which determines the state is related to an adaptive noise floor that is updated at least once every second. The noise floor is defined as the minimum frame energy during the past one second of data. If the noise floor remains unchanged for more than one second, it is reset to the minimum value over the past second, thus allowing the noise floor to adapt to changing levels of background noise. The noise floor adaptation is disabled while not in the transmit-off state. The energy threshold was set experimentally, as a constant multiplied by the noise floor.

The state machine transitions are defined as follows: While in the transmit-off state 12, if a frame's energy was greater than the energy threshold, the state changed to the transition state 14 from transmit-off to transmit-on. To reach the transmit-on state 16, three consecutive frames (36 milliseconds) of data must have energies above the defined threshold; otherwise the state machine 10 returns to the transmit-off state 12. While in the transmit-on state 16, a frame's energy below the threshold would cause the state machine to change to the transition state 18 from transmit-on to transmit-off state. To continue to the transmit-off state 12, twelve (12) consecutive frames (144 milliseconds) of data must have energy values below the energy threshold; otherwise the state machine 10 returns to the transmit-on state 18.

FIGS. 2a, 2b through 6a, 6b show five off-keyclicks and their envelopes (as defined below), representative of the emitting platforms in DB ONE. Note that the envelopes each contain a sequence of "pops", each pop corresponding to a peak.

An off-keyclick detector uses the approximate end-of-transmission boundary produced by the transmission detector as a rough estimate of the keyclick location. The 2048 points of data (205 milliseconds) surrounding the end-of-transmission are cross-correlated with a pop template over 1024 lags in the time domain. The template is a sinusoid whose amplitude is damped and whose frequency decays with time over a 128-sample period.

Since keyclicks are composed of a series of pops, analyzing the cross-correlation output for peaks reveals the locations in the end-of-transmission buffer that most resemble a "pop". The first "pop" detected and the last "pop" detected in the cross-correlation output correspond to the precise boundaries of the keyclick in the end-of-transmission buffer.

FEATURE EXTRACTION AND IDENTIFICATION

The envelope of the keyclick was determined using a two-stage leaky integrator of the form $$y[i]=w*y[i-1]+(1-w)*x[i]$$

where x[ ] is the input stream, y[ ] is the output stream, and w is the weight factor that is specified as an input parameter. Experimentation determined that two iterations of the integrator with w=0.9 followed by w=0.8 produce accurate envelopes.

Figure 7:
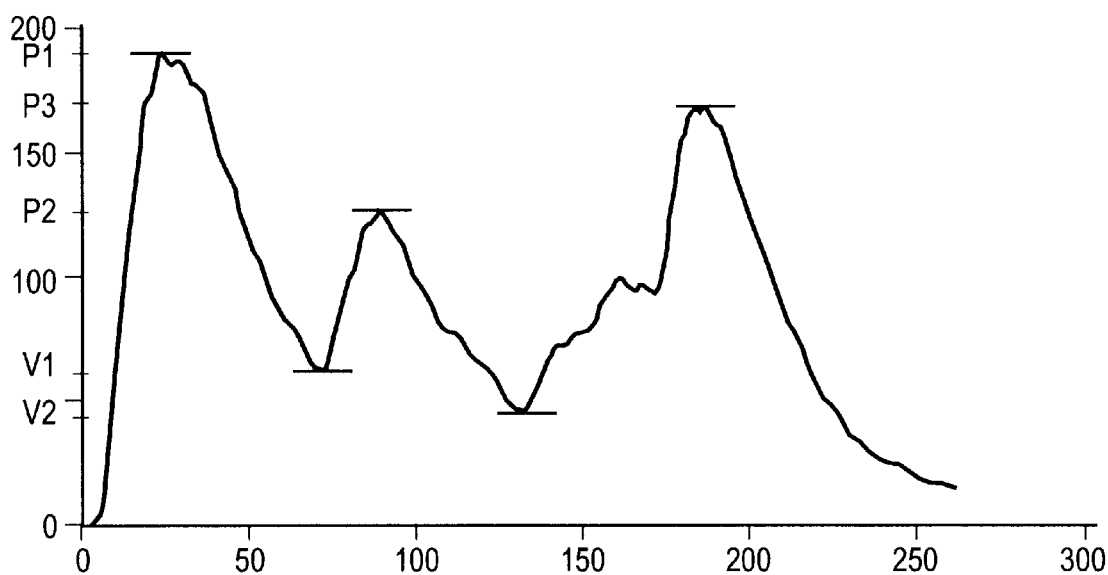
FIG. 7 is a plot illustrating the calculation of secondary keyclick features, according to the preferred embodiment of this invention.

The features used for identification are statistics derived from the envelope of the keyclick detected in the previous step. These statistics, illustrated in FIG. 7, are:

A. Number of pops (peaks), labeled P1, P2, P3, contained in the keyclick;

B. The average ratio of each pop's amplitude to the first pop's amplitude:

$$\text{Amplitude Ratio} = \frac{P2/P1 + P3/P1}{2}, \text{ and}$$

C. The average ratio of each pop's peak amplitude to its following valley, labeled V1, V2:

$$\text{Park to Volley Ratio} = \frac{P1/V1 + P2/V2}{2}.$$

Figure 8:
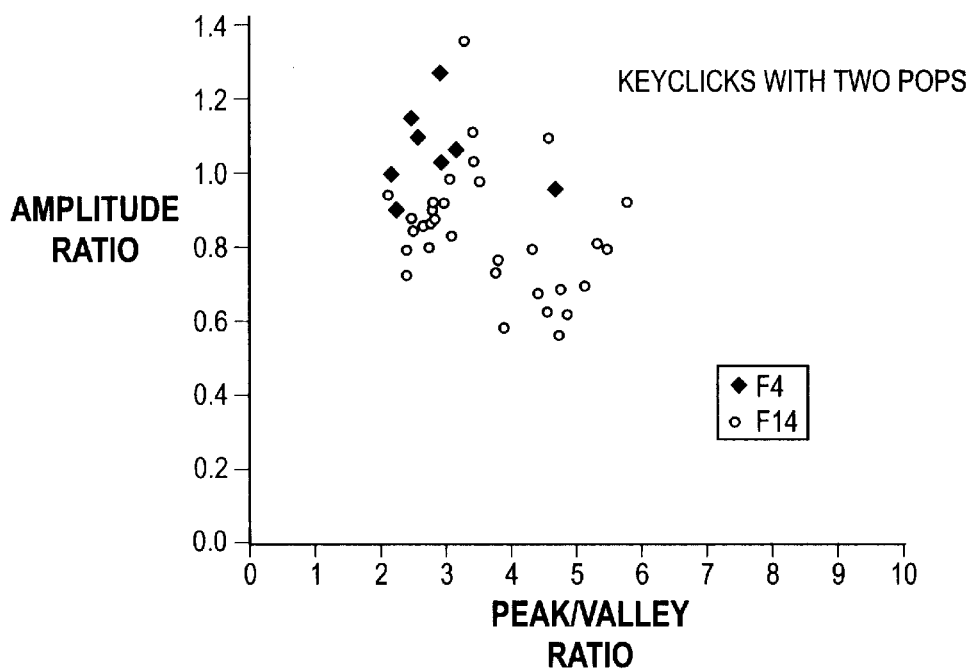
FIG. 8 is a scatter plot of the secondary features for keyclicks with two pops.
Figure 9:
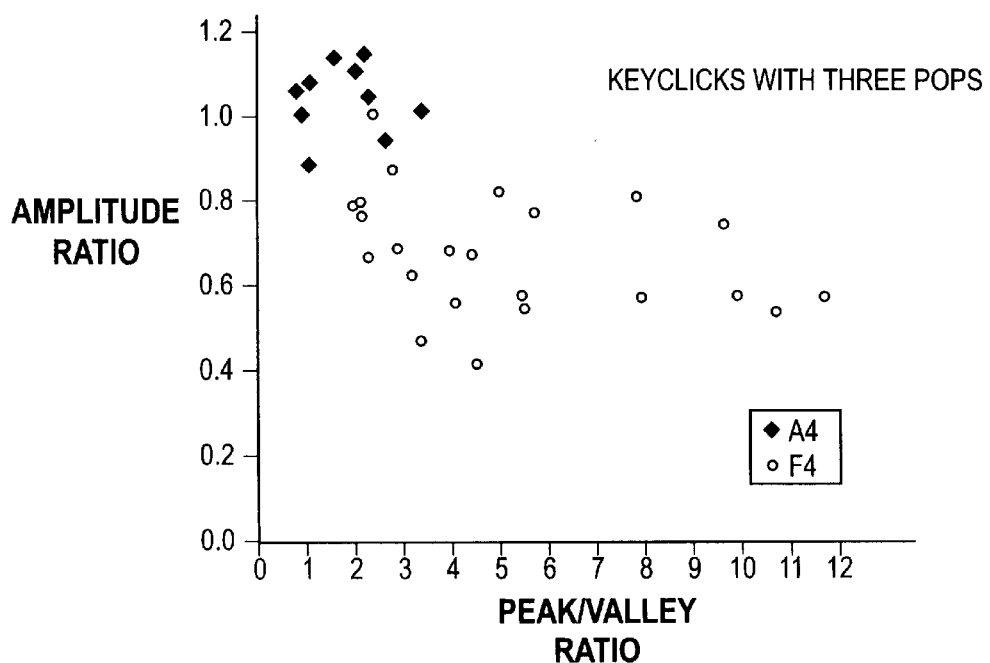
FIG. 9 is a scatter plot of the secondary features for keyclicks with three pops.

Identification of the keyclick was accomplished by applying the features extracted to one of two decision making routines explored. Scatter plots of these features are shown in FIGS. 8 and 9.

Figure 10:
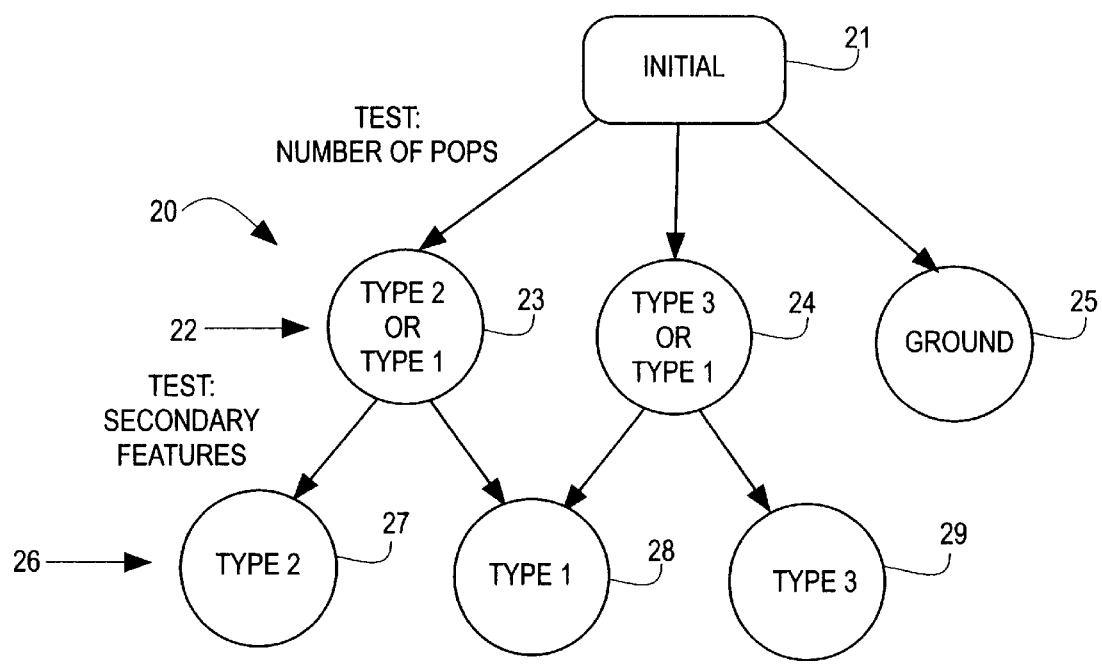
FIG. 10 is a diagram of a keyclick decision tree, according to the preferred embodiment of this invention.

The first decision method is a simple decision tree routine. FIG. 10 is an illustration of the keyclick decision tree 20, as used in the preferred embodiment of this invention. The decision tree 20 was initially determined by observing a small set of transmissions, obtaining scatter plots of the features extracted and determining thresholds for each rule. The decision rules were slightly modified as more data was added and eventually frozen before running final tests on a completely new set of data. A set of rules was tested for each of the features extracted. Decision tree 20 has two levels, 22, 26. At the start 21, the first level 22 decision is made on the basis of the number of pops. After a decision on level 22, the next level 26 decision is made on the basis of secondary features. For example, if the number of pops found in a keyclick was greater than three, the keyclick was identified as belonging to a ground station 25. If there were three pops in the keyclick, it belonged to a Type 3 or a Type 1 aircraft, 24. If two pops were found, it was either a Type 2 or a Type 1 aircraft, 23. Secondary testing was then applied based on the location of the keyclick in the plane (cf. FIGS. 8, 9) defined by the remaining two features, peak-to-valley-ratio (PVR) and average-amplitude-ratio (AAR). In the case of a keyclick with three pops, if its location on the PVR-AAR plane is above the line:

$$PVR=M1 \times AAR+B1 \ (M1=0.05, \ B1=0.80),$$

where M1, B1 are the slope and intercept respectively, then it was identified as a Type 3, 29. If below the line, it is identified as a Type 1, 28. Similarly, with a keyclick consisting of two pops, if its location in the PVR-AAR plane is above the line:

$$PVR=M2 \times AAR+B2 \ (M2=0.227, \ B2=0.236),$$

where M2, B2 are the slope and intercept respectively, it is identified as a Type 1, 28. Otherwise, it is identified as a Type 2, 27. See FIG. 10.

Figure 11:
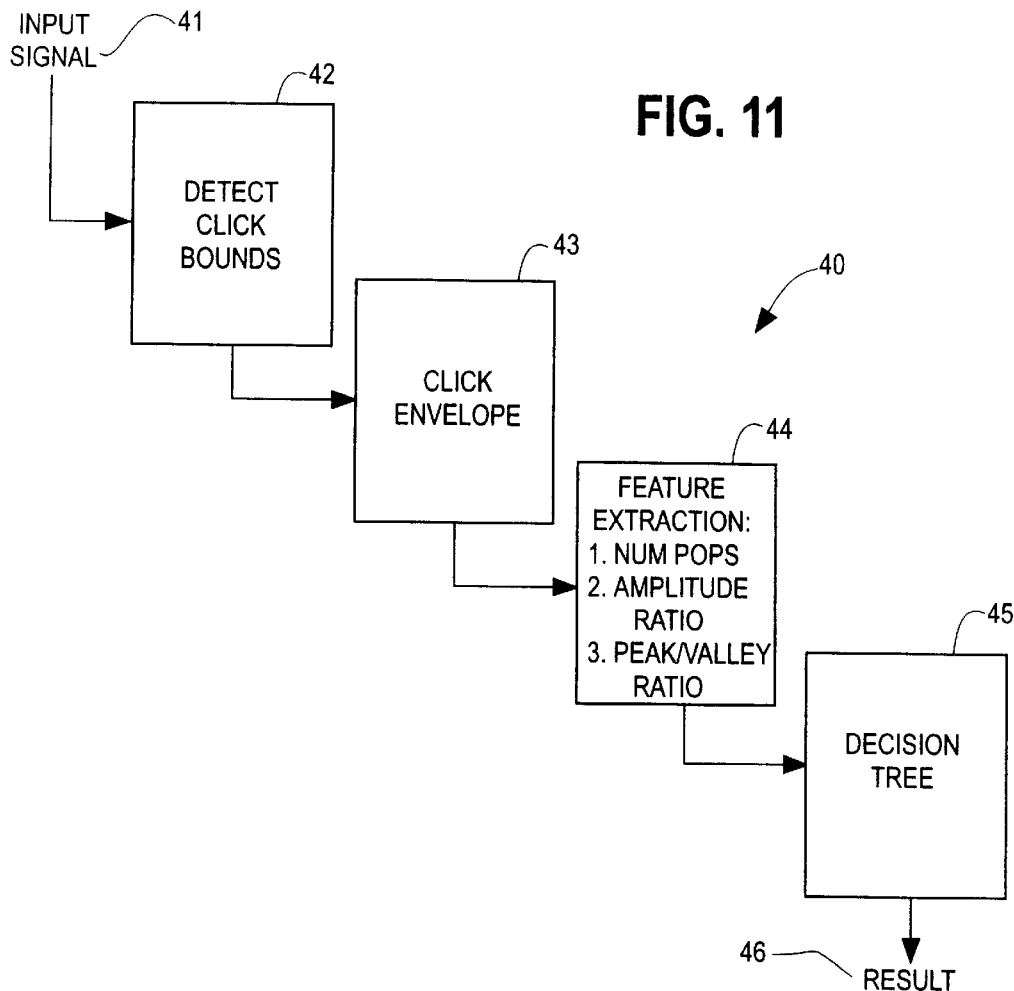
FIG. 11 is a flow diagram of the steps of the keyclick recognition algorithm, according to the preferred embodiment of this invention.

FIG. 11 is a block diagram summarizing the algorithmic steps 40 of emitter identification from radio signals (EMIRS), using the the the keyclick algorithm with decision tree, according to the preferred embodiment of this invention. This embodiment of EMIRS processing can be summarized in the following algorithmic steps.

1. Detect channel activity 41;
2. Detect boundaries for transmitter keying 42;
3. Extract keying envelope 43;
4. Analyze for keying envelope features 44:
   a. number of envelope peaks (pops);

b. determine amplitude ratios among peaks;

c. determine peak-to-valley ratios of envelope peaks; and

5. Execute the decision function based on the features extracted 45.

A second decision method investigated as an alternative to the decision tree of FIGS. 10, 11, was a Vector Quantization (VQ) approach. The same feature set was used as in the previous algorithm of FIG. 11. The training set used to create codebooks was the same used for initial recognition of the decision tree method. Codebooks with one, two, and four clusters were created for each platform type. During recognition, an input feature vector was scored with each codebook, returning the minimum distortion calculated. A decision was then made based on the distortion values returned for each platform. If no one distortion was significantly better then the rest, a no-decision was returned.

Finally, a report generation program was used to present the identification determination for each transmission and the cumulative results in a confusion matrix. (See FIG. 15.)

DB TWO KEYWORD DATABASE INVESTIGATIONS

The second approach to emitter identification from radio signals examined spectral features of transmission data. These included FFTs, bandpass filter energies (derived from FFTs), and spectral coefficients. Various means of representation, including spectrograms and three dimensional wavefall plots were utilized. It was clear from listening to DB TWO that there was relevant spectral information in that database. Therefore the spectral approach was adopted, using normalized energies in seven bandpass filters. Significant recognition performance resulted from this approach, using a filterbank algorithm, which is the subject of the cross-referenced application. Performance of 80% or better at distinguishing the emitter platform types involved (as identified by a human expert) was obtained.

DB TWO is a keyword database assembled for keyword spotting algorithm development. It consists of transmissions of operational data with speech in a foreign language. "Ground truth" information is not included. A former communications operator served as the expert for this data to supply ground truth information for the transmissions. By listening to transmissions, and relying on his considerable experience as an operational linguist, he recognized sounds such as whines and hums which identified broad aircraft type. The expert listened to the data, and identified the following types of emitting platforms in these transmissions: ground transmissions, helicopter transmissions, or aircraft transmissions from one of three types of aircraft, herein designated as Type 4, Type 5 or Type 6. These identifications served as "ground truth" to test the algorithms on this data.

Examination of time domain signals in DB TWO showed that these transmissions had keyclicks, but that the types of transmissions were not as readily distinguished by keyclicks as those examined in the data from DB ONE. In particular, all these keyclicks appeared to consist of just one pop. It was clear from preliminary listening tests that there was useful spectral information in the transmissions for identifying the various aircraft platforms, particularly in the speech gaps.

A preliminary investigation was performed using twenty transmissions of the DB TWO Keyword Database. The transmissions are described by Table 1. (For convenience, the tables appear at the end of this specification in numerical order.) Each transmission contains at least one gap as determined by a gap detection algorithm. A simple set of spectral features was chosen for gap detection. This set consisted of normalized energy per unit frequency in the following frequency bands:

50 to 500 Hz,
500 to 1000 Hz,
1000 to 1500 Hz,
1500 to 2000 Hz,
2000 to 2500 Hz,
2500 to 3000 Hz, and
3000 to 4000 Hz.

The region from 0 to 50 Hz was neglected to minimize detrimental effects due to DC offsets.

ALGORITHM

Figure 12:
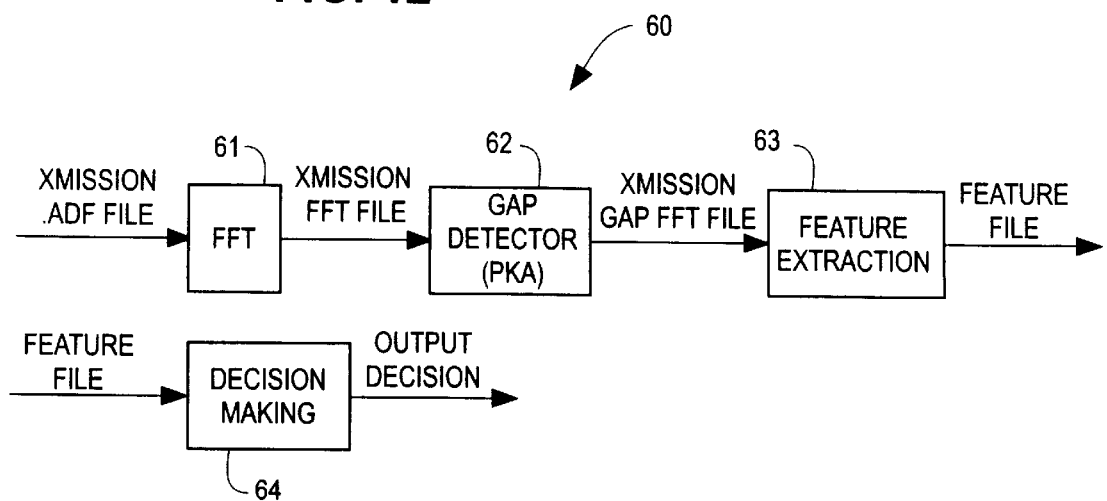
FIG. 12 is a flow diagram of the steps of the filter bank algorithm, according to the preferred embodiment of the invention disclosed in the cross-referenced application.

FIG. 12 is a block diagram of the preferred embodiment of a Filter Bank algorithm 60, which is claimed in the cross-referenced application, and which was developed to identify the emitting platforms exemplified in the data of DB-TWO. The intercepted transmission data is fed to a fast fourier transform algorithm 61 for initial processing. A 256-point FFT was used with a frame rate of sixty-four (64) samples (8 µsec.). The gap detector 62 makes a decision for each frame based on the peak-to-average energy value of the frame, thus determining the boundaries of the gaps within transmissions. Only frames labeled "gap", that is gaps in the speech signal, were processed further for feature extraction 63. Having extracted the features of each transmission, that is, the normalized energies in seven bandpass filters as indicated above, the feature file is processed for decision making 64. An output decision was made for each gap frame using a decision tree to determine an aircraft type from the frame's feature vector. The final transmission decision is the type most frequently chosen over all the gap frames of the transmission.

Table 2 specifies recognition results where recognition was performed on each hand-labeled gap. Thus transmissions with several gaps had several recognition trials. If different gaps of a transmission had different recognition outcomes, the transmission is recognized as uncertain (U).

Table 3 specifies recognition results where recognition is performed on each transmission. Here gaps were determined automatically using a peak-to-average energy statistic.

FINAL TESTING

KEYCLICK INVESTIGATIONS

Final testing of the keyclick recognition and filter bank algorithms was performed on a set of data distinct from what had been used during algorithm development. One hundred new transmissions were selected, evenly distributed among four emitting platforms to be recognized. This first test performed was on the Decision Tree algorithm using automatic transmission and keyclick labeling capabilities. An improved transmission detector was used in this test. The confusion matrix in Table 4 shows the results with forced decisions (0% no-decision rate). A second test was run using hand-labeled off-keyclicks from the final test set. The forced decision results are illustrated in Table 5.

Figure 13:
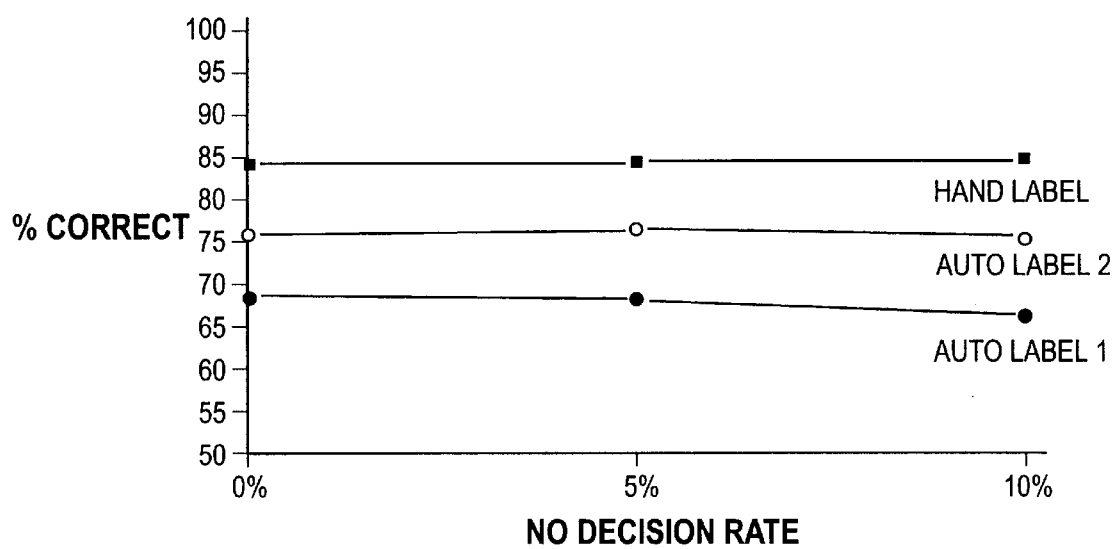
FIG. 13 shows no-decision recognition test results for the filter bank recognition algorithm using a decision tree.

Tests were run that varied the no-decision rates for the algorithm versions described above. FIG. 13 depicts the relative recognition levels for the algorithms (including an early version of the transmission detector) and the effects of changing decision rates. It was apparent that the no-decision capabilities had no significant effect on the Decision Tree algorithms.

The next set of tests involved the Vector Quantization (VQ) keyclick recognition module. In each case, the hand-labeled set of final test keyclicks was used (for comparison with the hand-labeled Decision Tree tests). The average click duration was about 500 samples, or 64 milliseconds. In these tests, training was performed on the set of data used for initial recognition in the Decision Tree investigations. This included 11 ground transmissions, 26 Type 3 aircraft transmissions 16 Type 1 aircraft transmissions, and 36 Type 2 aircraft transmissions.

The three VQ experiments used codebooks containing one cluster center for each platform, two cluster centers per platform, and four cluster centers per platform. The forced decision confusion matrices for the tests are shown in Tables 6, 7, and 8. The tables also show how many training instances were included in each cluster.

The results are surprising in that the test using a VQ codebook of size one out-performed the other two tests. The only difference between the first VQ test results and the second was the drop in Type 1 aircraft recognition. The final VQ test using a size four codebook gained slightly in Type 1 aircraft recognition, but not enough to raise total performance to the levels of the size one codebook test.

Figure 14:
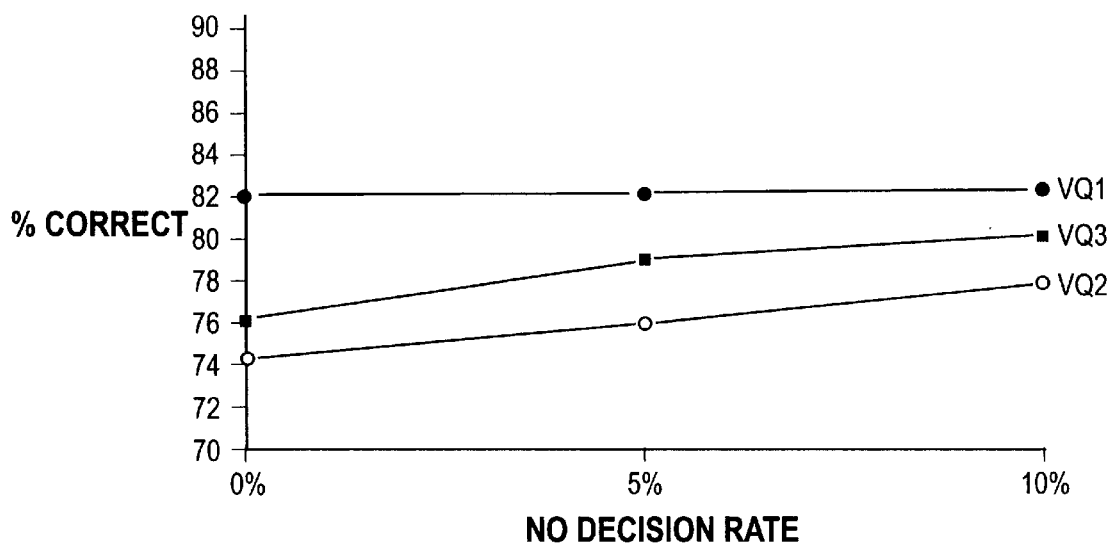
FIG. 14 shows no-decision recognition test results for the filter bank recognition algorithm using vector quantization.

While the VQ recognition using multiple cluster codebooks were out-performed by the single cluster codebook, the effects of varied decision rates were more significant with the multiple cluster codebooks than the single cluster codebook. FIG. 14 shows the relative recognition results for no-decision rates of zero percent, five percent, and ten percent for each of the VQ tests.

Despite the slightly better performance of the Decision Tree algorithm to the VQ algorithm, it is believed that the VQ algorithm shows greater promise. It is believed that VQ performance can be improved with more experimentation while the Decision Tree results represent optimal performance. The lack of an effective no-decision capability for the Decision Tree is another shortfall in its comparison with VQ methods.

INTERPRETATION

The keyclick results on the final test data indicate that it is an effective algorithm for distinguishing aircraft types from transmissions of the type included in the database. The errors that occur are of three types: inaccurate transmission detection, inaccurate keyclick boundary determination, and confusions of Type 1 aircraft with Type 3 aircraft or Type 2 aircraft due to keyclicks where the number of pops does not determine the result.

Improved transmission detection eliminated most errors of the first type. It remains the case that performance improves, on the order of ten percent, when keyclick boundaries are hand-labeled. Therefore, further work must be done to improve the automatic keyclick boundary detection procedure.

The secondary features correctly resolve most potential confusions of Type 1 aircraft with Type 3 aircraft or Type 2 aircraft with the same number (three or two, respectively) of pops. Correcting the errors that do occur may be a more difficult problem.

CONCLUSIONS

Two algorithms for identifying transmission sources have been disclosed. One uses off-click signatures from audio transmissions. The second, developed using DB-TWO Keyword database, uses a digital filterbank. This section summarizes these algorithms.

KEYCLICK RECOGNITION

In the keyclick recognition algorithm, as shown in FIG. 11, the following processes operate on each transmission in the data file:
  A. Transmission Detection.
  B. Click Detection.
  C. Feature Extraction and identification.

Transmission Detection

Figure 15:
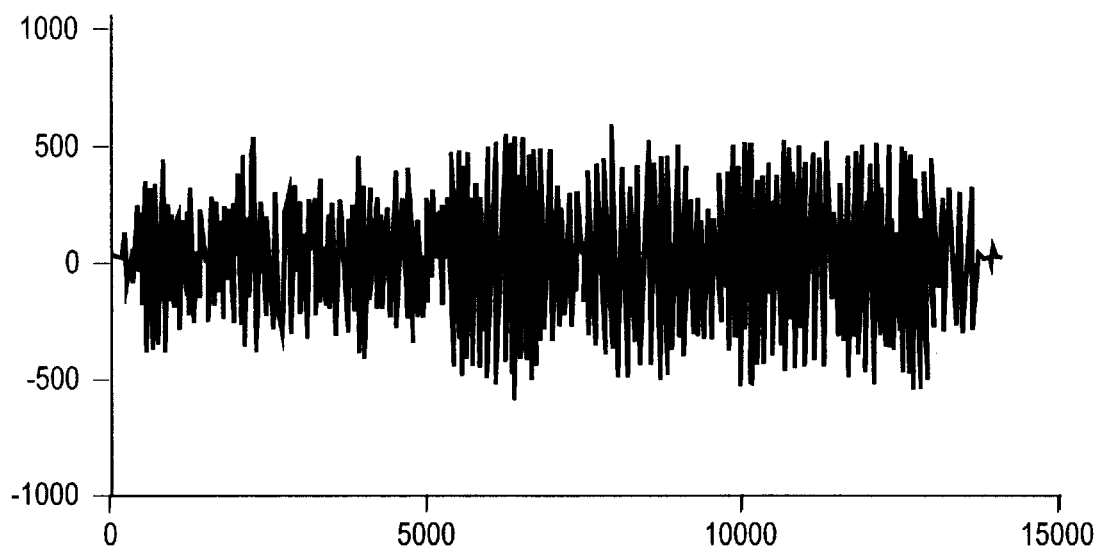
FIG. 15 is a plot of a labeled transmission.

Transmission detection is accomplished through energy thresholding over 16 millisecond frames data to determine the approximate boundaries of a transmission. A labeled transmission, such as that in FIG. 15, is displayed as output from this step (41 in FIG. 11).

Click Detection

Figure 16:
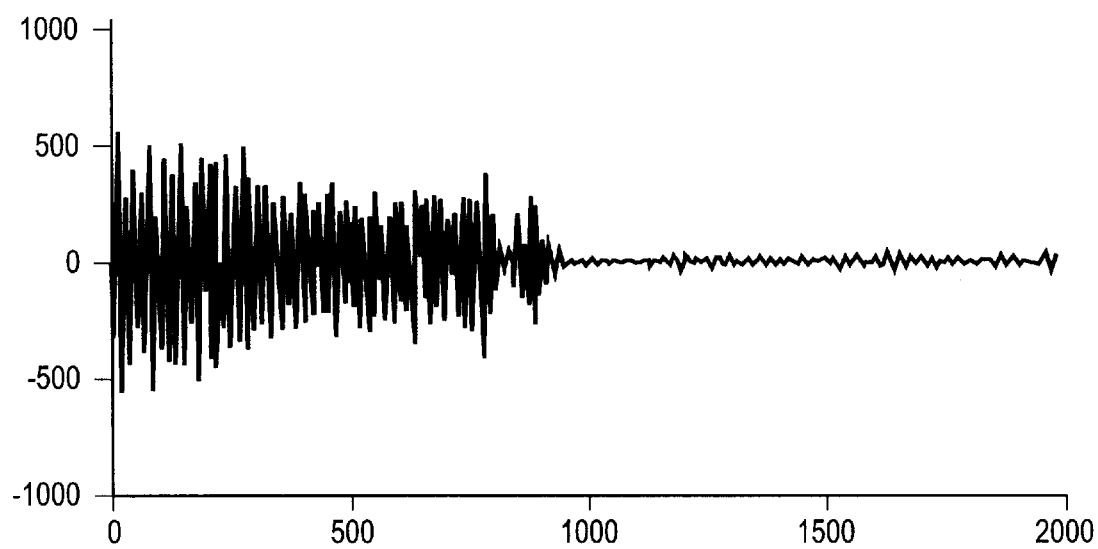
FIG. 16 is a plot of approximate keyclick boundaries.
Figure 17:
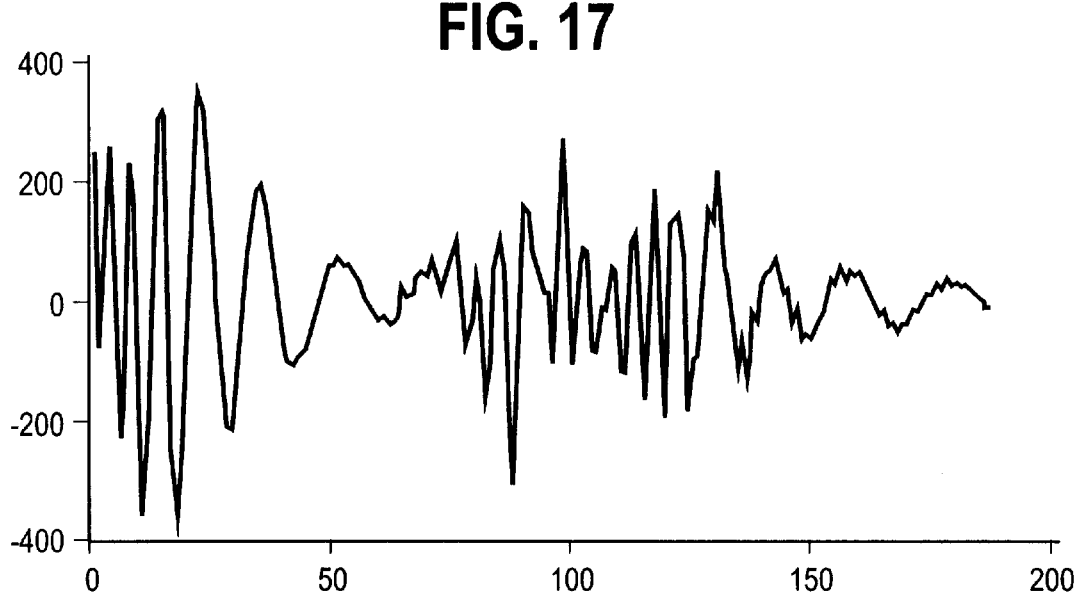
FIG. 17 is a plot of precise keyclick boundaries.
Figure 18:
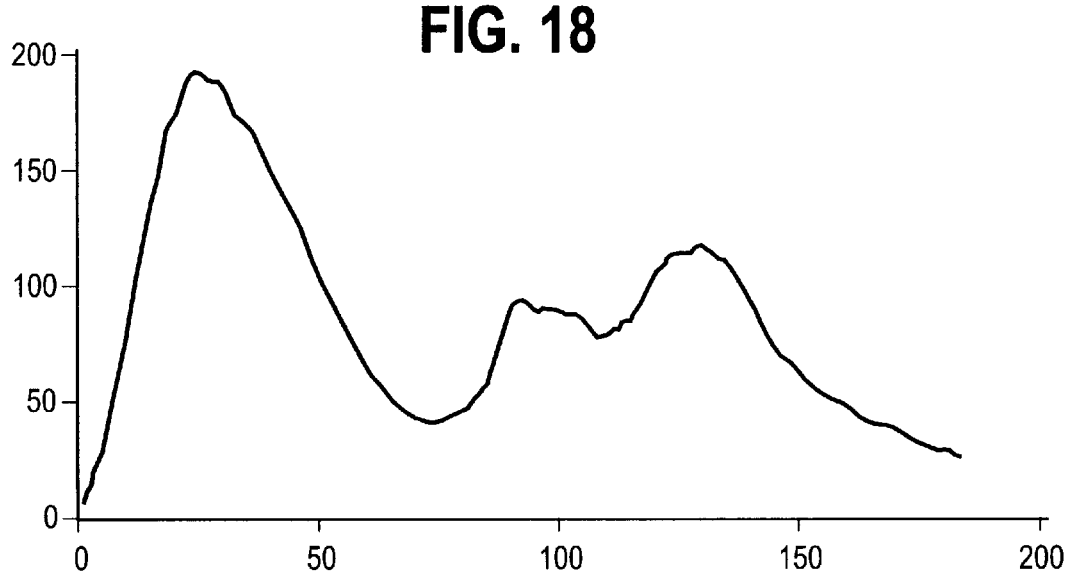
FIG. 18 shows an envelope of the keyclick of FIG. 17.

The off-keyclick detector 42 uses the approximate end-of-transmission boundary produced by the transmission detector as a rough estimate of the keyclick location. The end-of-transmission time and the surrounding 2048 points of data (0.25 seconds) are cross-correlated in the time domain with a pop template. Since keyclicks are composed of a series of pops, thresholding on the resulting cross correlation results in precise keyclick boundaries. The keyclick envelope 43 is determined using a two-stage leaky integrator. The envelope is displayed as in FIG. 18. Approximate and more precise keyclick boundaries, as suggested by FIGS. 16 and 17, respectively, are displayed as output from this step 43.

Feature Extraction and Identification

The features used for identification 44 are statistics derived from the envelope of the keyclick detected in the previous step 43. Identification of the keyclick is accomplished by applying the features extracted to one of two decision making routines explored 45.

Figures 19, 20:
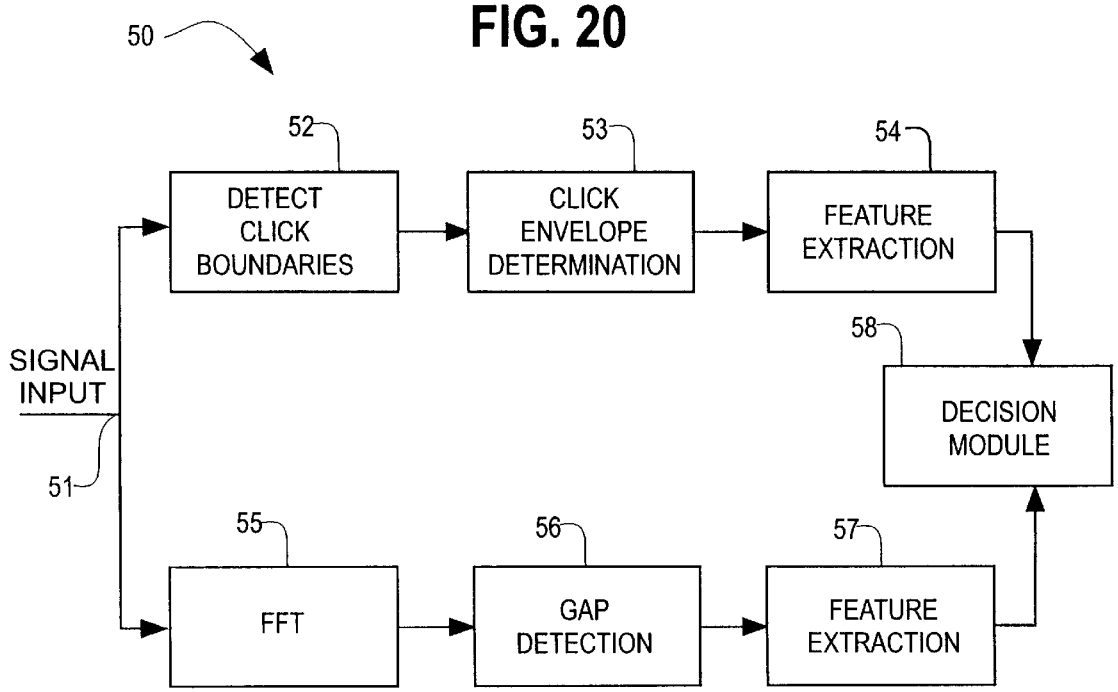
FIG. 19 is a confusion matrix of recognition results using the preferred embodiment of the keyclick algorithm.
FIG. 20 is a flow chart illustrating an embodiment of the keyclick algorithm of this invention and an embodiment of the filter bank algorithm of the cross-referenced invention operating in parallel on the same data.

A report generation program is used to present the identification determination for each transmission and the cumulative results in a confusion matrix such as that shown in FIG. 19.

DB-TWO KEYWORD DATABASE INVESTIGATIONS

The filter bank algorithm, shown in FIG. 12, developed for the Keyword Database operates on a set of preprocessed feature files representing the majority of the transmissions labeled so far. This algorithm is, in effect, an additional means of feature extraction for cases which cannot be decided using the keyclick algorithm. For this algorithm, the features extracted are the normalized energies in seven bandpass filters, which, on the basis of experimentation, are distinctively representative of different types of emitter platforms.

PARALLEL OPERATIONS

FIG. 20 is a flow chart showing parallel operation 50 of embodiments of both algorithms. The same signal inputs 51 are processed by the key click algorithm and the filter bank algorithm simultaneously. In the keyclick algorithm, the keyclick boundaries are detected 51, the keyclick envelope is determined 53, the features, such as number or peaks, AAR and PVR, are extracted 54. Then the results of the processing thus far are sent to a decision module 58. Simultaneously, the input signal is processed by a fast fourier transform 55, the gaps are detected 56, and the features, such as normalized energies in seven bandpass filters, are extracted 57. The results of this processing are also sent to the decision module 58. The decision module can use either a decision tree or a vector quantization routine to make an identification decision based on the results of both algorithms.

The decision function used can be either a decision tree search or a codebook search, depending on the nature of the extracted features. Both function types were executed and work equally well. Similarly, EMIRS has two feature extraction functions which can be used separately or in tandem to identify the emitting platform.

EMIRS was implemented on a SUN workstation and a VAX workstation using Unix and the C language.

TABLE 1

RADC Keyword Database Transmissions.

| Platform | Transmissions | Total Gaps | Number of Individual Tails |
|---|---|---|---|
| H | 4 | 7 | 2 |
| Type 4 | 7 | 11 | >=4 |
| Type 5 | 4 | 6 | 3 |
| Type 6 | 5 | 7 | 3 |
| Total | 20 | 31 | >=12 |

TABLE 2

Recognition Results Using Hand-labeled Gaps.

| | | RECOGNIZED AS | | | | | TOTALS | |
|---|---|---|---|---|---|---|---|---|
| | | H | Type 4 | Type 5 | Type 6 | U | | |
| A | H | 3 | 0 | 0 | 0 | 1 | 3/4 | 75% |
| C | Type 4 | 0 | 5 | 1 | 0 | 1 | 5/7 | 71% |
| T | Type 5 | 0 | 0 | 4 | 0 | 0 | 4/4 | 100% |

TABLE 2-continued

Recognition Results Using Hand-labeled Gaps.

| | | RECOGNIZED AS | | | | | TOTALS | |
|---|---|---|---|---|---|---|---|---|
| | | H | Type 4 | Type 5 | Type 6 | U | | |
| U | Type 6 | 0 | 0 | 0 | 5 | 0 | 5/5 | 100% |
| AL | | | | | | | 17/20 | 85% |

TABLE 3

Recognition on Transmission Using Automatically Detected Gaps.

| | | RECOGNIZED AS | | | | TOTALS | |
|---|---|---|---|---|---|---|---|
| | | H | Type 4 | Type 5 | Type 6 | | |
| A | H | 4 | 0 | 0 | 0 | 4/4 | 100% |
| C | Type 4 | 2 | 4 | 1 | 0 | 4/7 | 57% |
| T | Type 5 | 0 | 0 | 3 | 1 | 3/4 | 75% |
| U | Type 6 | 0 | 0 | 0 | 5 | 5/5 | 100% |
| AL | | | | | | 16/20 | 80% |

TABLE 4

Results for Improved Automatic Keyclick Detection with Decision Tree

| | Ground | Type 3 | Type 1 | Type 2 | SCORE | |
|---|---|---|---|---|---|---|
| GROUND | 20 | 3 | 0 | 2 | 20/25 | 80.00% |
| Type 3 | 3 | 20 | 1 | 2 | 20/26 | 76.92% |
| Type 1 | 7 | 0 | 18 | 0 | 18/25 | 72.00% |
| Type 2 | 1 | 0 | 5 | 18 | 18/24 | 75.00% |
| | | | | NO-DECISIONS: | 0/100 | 0.00% |
| | | | | TOTAL: | 76/100 | 76.00% |

TABLE 5

Results for Hand Labeled Keyclicks with Decision Tree

| | Ground | Type 3 | Type 1 | Type 2 | SCORE | |
|---|---|---|---|---|---|---|
| GROUND | 22 | 0 | 1 | 2 | 22/25 | 88.00% |
| Type 3 | 1 | 22 | 1 | 2 | 22/26 | 84.62% |
| Type 1 | 4 | 0 | 21 | 0 | 21/25 | 84.00% |
| Type 2 | 1 | 0 | 3 | 20 | 20/24 | 83.33% |
| | | | | NO-DECISIONS: | 0/100 | 0.00% |
| | | | | TOTAL: | 85/100 | 85.00% |

TABLE 6

Results for Hand Labeled Keyclicks with Vector Quantization Codebook Size One

| | Ground | Type 3 | Type 1 | Type 2 | SCORE | | Training Cluster Sizes |
|---|---|---|---|---|---|---|---|
| GROUND | 19 | 0 | 5 | 1 | 19/25 | 76.00% | 11 |
| Type 3 | 0 | 22 | 3 | 1 | 22/26 | 84.62% | 26 |
| Type 1 | 0 | 0 | 25 | 0 | 25/25 | 100.00% | 16 |

TABLE 6-continued

Results for Hand Labeled Keyclicks with Vector Quantization Codebook Size One

|        | Ground | Type 3 | Type 1 | Type 2 | SCORE | | Training Cluster Sizes |
|--------|--------|--------|--------|--------|-------|---|------------------------|
| Type 2 | 0      | 1      | 7      | 16     | 16/24 | 66.67% | 36 |
|        |        |        |        | NO-DECISIONS: | 0/100 | 0.00% | |
|        |        |        |        | TOTAL: | 82/100 | 82.00% | |

TABLE 7

Results for Hand Labeled Keyclicks with Vector Quantization Codebook Size One

|        | Ground | Type 3 | Type 1 | Type 2 | SCORE | | Training Cluster Sizes |
|--------|--------|--------|--------|--------|-------|---|------------------------|
| GROUND | 19     | 0      | 5      | 1      | 19/25 | 76.00% | 5, 6 |
| Type 3 | 1      | 22     | 1      | 2      | 22/26 | 84.62% | 17, 9 |
| Type 1 | 0      | 0      | 17     | 8      | 17/25 | 68.00% | 7, 9 |
| Type 2 | 0      | 0      | 8      | 16     | 16/24 | 66.67% | 21, 15 |
|        |        |        |        | NO-DECISIONS: | 0/100 | 0.00% | |
|        |        |        |        | TOTAL: | 74/100 | 74.00% | |

TABLE 8

Results for Hand Labeled Keyclicks with Vector Quantization Codebook Size One

|        | Ground | Type 3 | Type 1 | Type 2 | SCORE | | Training Cluster Sizes |
|--------|--------|--------|--------|--------|-------|---|------------------------|
| GROUND | 18     | 1      | 4      | 2      | 18/25 | 72.00% | 2, 3, 3, 3 |
| Type 3 | 2      | 21     | 0      | 3      | 21/26 | 80.77% | 6, 10, 5, 5 |
| Type 1 | 0      | 0      | 21     | 4      | 21/25 | 84.00% | 3, 4, 5, 4 |
| Type 2 | 0      | 0      | 8      | 16     | 16/24 | 66.67% | 6, 14, 6, 10 |
|        |        |        |        | NO-DECISIONS: | 0/100 | 0.00% | |
|        |        |        |        | TOTAL: | 76/100 | 76.00% | |

We claim:

1. A system for emitter identification of a transmitting platform using microphone keyclick analysis, comprising:
    means to detect transmission activity on a radio channel in the audio frequency range;
    means to detect the boundaries of transmitter keyclicks at the beginning and end of said transmission;
    means to extract keying envelopes from said detected keyclick boundaries;
    means to analyze said keying envelopes to extract features characteristic of said keyclicks;
    means to execute a decision function based on said extracted characteristic features to identify the platform of said transmitter based on the features of said keyclick.

2. The system of claim 1, wherein said means to detect transmission activity comprises:
    means to select an adaptive noise floor;
    means to update said noise floor periodically;
    means to determine an energy threshold of a transmission relative to said adaptive noise floor;
    means to determine the transitions from transmit on to transmit off relative to said adaptive noise floor, thereby determining end of transmission boundaries; and
    means to store said end of transmission boundaries.

3. The system of claim 2, wherein said means to detect the boundaries of a transmitter keyclick further comprises:
    means to analyze said approximate end of transmission boundary to determine energy peaks;
    means to cross-correlate said peaks with a template of known emitters, thereby detecting the precise boundaries of a keyclick.

4. The system of claim 3, wherein said means to extract a keying envelope further comprises:
    means to develop an envelope around each peak using a leaky integration of the form:

$$y[i]=w*y[i-1]+(1-w)*x[i]$$

where x[ ] is the input stream, y[ ] is the output stream, and w is the weight factor that is specified as an input parameter.

5. The system of claim 4, wherein said means to extract features characteristic of keyclicks, comprises:

means to determine the number of peaks in each of said envelopes;

means to calculate the average ratio of each peak to the first peak in each of said envelopes;

means to calculate the average ratio of each peak to its following valley in each of said envelopes; thereby extracting statistical data constituting said features.

6. The system of claim 5, wherein said means to execute a decision function further comprises:

means to establish a decision tree based on scatter plots of past known identities;

means to establish a set of rules based on past analyses, and to determine thresholds for said rules; and means to apply currently extracted features to a data base constructed with said rules and thresholds.

7. The system of claim 5, wherein said means to identify an emitting platform further comprises:

means to utilize a vector quantization algorithm to determine minimum distortion of a current vector compared to past vectors.

8. The system of claim 7, wherein said vector quantization algorithm comprises:

at least one codebook having at least one cluster developed on the basis of training data;

means to score said extracted features with each codebook;

means to calculate the minimum distortion of said extracted features; and means to identify a platform based on said scores.

9. The system of claim 1, further comprising:

means to process said transmission data using a fast fourier transform;

means to detect gaps in said processed transmission data;

means to extract spectral features of each transmission from said gaps, consisting of normalized energy per unit frequency; and means to correlate identification of said emitter platforms based on said extracted spectral features with identification of said emitter platforms based on said extracted keyclick features.

10. A method of emitter identification of a transmitting platform using microphone keyclick analysis, comprising the steps of:

detecting transmission activity on a radio channel in the audio frequency range;

detecting the boundaries of transmitter keyclicks at the beginning and end of said transmission;

extracting keying envelopes from said detected keyclick boundaries;

analyzing said keying envelopes to extract features characteristic of said keyclicks;

executing a decision function based on said extracted characteristic features to identify the platform of said transmitter based on the features of said keyclick.

11. The method of claim 10, wherein said step of detecting transmission activity further comprises the steps of:

selecting an adaptive noise floor;

updating said noise floor periodically;

determining an energy threshold of a transmission relative to said adaptive noise floor;

determining the transitions from transmit on to transmit off relative to said adaptive noise floor, thereby determining end of transmission boundaries; and storing said end of transmission boundaries.

12. The method of claim 11, wherein said step of detecting the boundaries of a transmitter keyclick further comprises the steps of:

analyzing said approximate end of transmission boundary to determine energy peaks; and cross-correlating said peaks with a template of known emitters, thereby detecting the precise boundaries of a keyclick.

13. The method of claim 12, wherein said step of extracting a keying envelope further comprises the step of:

developing an envelope around each peak using a leaky integration of the form:

$$y[i]=w*y[i-1]+(1-w)*x[i]$$

where x[ ] is the input stream, y[ ] is the output stream, and w is the weight factor that is specified as an input parameter.

14. The method of claim 13, wherein said step of extracting features characteristic of keyclicks, further comprises the steps of:

determining the number of peaks in each of said envelopes;

calculating the average ratio of each peak to the first peak in each of said envelopes; and calculating the average ratio of each peak to its following valley in each of said envelopes; thereby extracting statistical data constituting said features.

15. The method of claim 14, wherein said step of executing a decision function further comprises the steps of:

establishing a decision tree based on scatter plots of past known identities;

establishing a set of rules based on past analyses, and determining thresholds for said rules; and applying currently extracted features to a data base constructed with said rules and thresholds.

16. The method of claim 15, wherein said step of identifying an emitting platform further comprises the step of:

utilizing a vector quantization algorithm to determine minimum distortion of a current vector compared to past vectors.

17. The method of claim 16, wherein said step of utilizing a vector quantization algorithm further comprises the steps of:

utilizing at least one codebook having at least one cluster developed on the basis of training data;

scoring said extracted features with each codebook;

calculating the minimum distortion of said extracted features; and identifying an emitting platform based on said scores.

18. The method of claim 10, further comprising the steps of:

processing said transmission data using a fast fourier transform;

detecting gaps in said processed transmission data;

extracting spectral features of each transmission from said gaps, consisting of normalized energy per unit frequency; and correlating identification of said emitter platforms based on said extracted spectral features with identification of said emitter platforms based on said extracted keyclick features.

* * * * *

UNITED STATES PATENT AND TRADEMARK OFFICE
CERTIFICATE OF CORRECTION

PATENT NO.      : 6,215,440 B1
DATED           : April 10, 2001
INVENTOR(S)     : Timothy A. Geldart et al.

It is certified that error appears in the above-identified patent and that said Letters Patent is hereby corrected as shown below:

Column 5,
Line 32, insert the heading -- CLICK DETECTION -- before the line beginning "FIGS. 2a, 2b through 6a, 6b …"

Column 6,
Line 11, delete "Park to Volley" and insert -- Peak to Valley --

Column 8,
Line 32, insert the heading -- PERFORMANCE -- before the line beginning "Table 2 specifies …"

Signed and Sealed this

Second Day of December, 2003

JAMES E. ROGAN
*Director of the United States Patent and Trademark Office*